US012786803B2

(12) United States Patent
Tian et al.

(10) Patent No.: US 12,786,803 B2
(45) Date of Patent: Nov. 3, 2026

(54) RESOURCE RESERVATION METHOD AND TERMINAL DEVICE

(71) Applicant: DATANG MOBILE COMMUNICATIONS EQUIPMENT CO., LTD., Beijing (CN)

(72) Inventors: Yan Tian, Beijing (CN); Xiaotao Ren, Beijing (CN)

(73) Assignee: DATANG MOBILE EQUIPMENT CO., LTD., Beijing (CN)

( * ) Notice: Subject to any disclaimer, the term of this patent is extended or adjusted under 35 U.S.C. 154(b) by 301 days.

(21) Appl. No.: 18/696,361

(22) PCT Filed: Jun. 9, 2022

(86) PCT No.: PCT/CN2022/097896
§ 371 (c)(1),
(2) Date: Mar. 28, 2024

(87) PCT Pub. No.: WO2023/050870
PCT Pub. Date: Apr. 6, 2023

(65) Prior Publication Data
US 2024/0388971 A1 Nov. 21, 2024

(30) Foreign Application Priority Data
Sep. 30, 2021 (CN) .......................... 202111157372.1

(51) Int. Cl.
*H04W 28/26* (2009.01)
*H04W 28/06* (2009.01)
*H04W 74/0808* (2024.01)

(52) U.S. Cl.
CPC ........... *H04W 28/26* (2013.01); *H04W 28/06* (2013.01); *H04W 74/0808* (2013.01)

(58) Field of Classification Search
CPC .. H04W 28/26; H04W 28/06; H04W 74/0808
See application file for complete search history.

(56) References Cited

U.S. PATENT DOCUMENTS

2020/0068531 A1 2/2020 Sundberg et al.
2022/0312479 A1* 9/2022 Farag .................... H04W 72/02
(Continued)

FOREIGN PATENT DOCUMENTS

CN 113455078 A 9/2021
WO 2021075936 A1 4/2021
WO WO-2022236633 A1 * 11/2022 ............ H04W 72/02

OTHER PUBLICATIONS

Provisional U.S. Appl. No. 63/162,891, filed Mar. 18, 2021. (Year: 2021).*
(Continued)

*Primary Examiner* — Melvin C Marcelo
(74) *Attorney, Agent, or Firm* — KILPATRICK TOWNSEND & STOCKTON LLP

(57) ABSTRACT

A resource reservation method and a terminal device are disclosed. The method includes: when a resource reservation mode of a current service includes partial sensing and re-evaluation and/or preemption checking, controlling the partial sensing not to overlap with the re-evaluation and/or the preemption checking in a time domain; or, when there is an overlapping portion between the partial sensing and the re-evaluation and/or the preemption checking in the time domain, performing the re-evaluation and/or the preemption checking through the partial sensing for the overlapping portion; and reserving a target resource for information transmission based on a sensing result of the re-evaluation and/or the preemption checking.

18 Claims, 3 Drawing Sheets

(56) References Cited

U.S. PATENT DOCUMENTS

2023/0319578 A1* 10/2023 Farag .................... H04W 16/02
370/330
2023/0363050 A1* 11/2023 Zeng ................. H04W 52/0216

OTHER PUBLICATIONS

Provisional U.S. Appl. No. 63/168,839 filed Mar. 31, 2021. (Year: 2021).*

Provisional U.S. Appl. No. 63/226,542 filed Jul. 28, 2021. (Year: 2021).*

Oppo, R1-2101412, 'FL summary for Al 8.11.1.1—resource allocation for power saving', 3GPP TSG RAN WG1 #104-e, Jan. 25-Feb. 5, 2021. (Year: 2021).*

LG, R1-2100517, 'Discussion on resource allocation for power saving', 3GPP TSG RAN WG1 Meeting #104-e, Jan. 25-Feb. 5, 2021. (Year: 2021).*

European Patent Office, Extended European Search Report Issued in Application No. 22874268.0, Nov. 29, 2024, Germany, 11 pages.

Apple, "Discussion on Sidelink Resource Allocation for Power Saving", 3GPP TSG RAN WG1 #104b-e, e-Meeting, Apr. 12-20, 2021, total 13 pages, R1-2103121.

Apple, "On Sidelink Resource Allocation for Power Saving", 3GPP TSG RAN WG1 #105-e, e-Meeting, May 10-27, 2021, total 13 pages, R1-2105126.

Apple, "Sidelink Resource Allocation for Power Saving", 3GPP TSG RAN WG1 #104-e, e-Meeting, Jan. 25-Feb. 5, 2021, total 7 pages, R1-2101357.

Moderator (Oppo), "FL summary for Al 8.11.1.1—resource allocation for power saving (final)", 3GPP TSG RAN WG1 #104b-e, e-Meeting, Apr. 12-20, 2021, total 122 pages, R1-2104093.

Xiaomi. "Discussion on Sidelink Resource Allocation Enhancement for Power Saving", 3GPP TSG RAN WG1 #104b-e, e-Meeting, Apr. 12-20, 2021, total 7 pages, R1-2102965.

Moderator (Oppo), "FL summary for Al 8.11.1.1—resource allocation for power saving (2nd check point)", 3GPP TSG RAN WG1 #105-e, e-Meeting, May 10-27, 2021, total 83 pages, R1-2106031.

Intel Corporation, "Sidelink Resource Allocation Schemes for UE Power Saving", 3GPP TSG RAN WG1 #106-e, e-Meeting, Aug. 16-27, 2021, total 26 pages, R1-2107609.

Xiaomi, "Discussion on Sidelink Resource Allocation Enhancement for Power Saving", 3GPP TSG RAN WG1 #106-e, e-Meeting, Aug. 16-27, 2021, total 7 pages, R1-2107899.

The first office action and search report issued in Chinese corresponding application 202111157372.1, mailed on Oct. 17, 2025.

Lenovo, et al., "Sidelink resource allocation for power saving", 3GPP TSG RAN WG1 #106-e, e-Meeting, Aug. 16-27, 2021, total 9 pages, R1-2107163.

Sony, "Discussion on sidelink resource allocation for power saving", 3GPP TSG RAN WG1 #106-e, e-Meeting, Aug. 16-27, 2021, total 6 pages, R1-2106818.

The second office action issued in Chinese corresponding application 202111157372.1, mailed on May 23, 2026.

* cited by examiner

RESOURCE RESERVATION METHOD AND TERMINAL DEVICE

CROSS REFERENCE TO RELATED APPLICATION

This application is a US National Stage of International Application No. PCT/CN2022/097896, filed on Jun. 9, 2022, which claims priority to Chinese Patent Application No. 202111157372.1, filed with the China National Intellectual Property Administration on Sep. 30, 2021 and entitled “Resource Reservation Method and Terminal Device”, the content of which is hereby incorporated by reference in its entirety.

FIELD

The present application relates to the field of wireless communications, and in particular to a resource reservation method and a terminal device.

BACKGROUND

At present, in a New Radio Access Technology (NR) and intelligent connected vehicle technology (Vehicle-to-Everything, V2X) system, a User Equipment (UE) can monitor a reservation status of periodic reserved resources of other UEs through partial sensing, exclude resources already occupied by the other UEs among candidate resources, and select a resource from remaining candidate resources for reservation.

The resource reserved by the UE through partial sensing may still be occupied by the other UEs, causing resource collisions. Through re-evaluation and/or preemption checking, resource collisions caused by the above situation can be reduced and reliability of resource transmission can be ensured. However, when the UE performs re-evaluation and/or preemption checking and partial sensing at the same time, power consumption of the UE may be increased.

SUMMARY

Embodiments of the present application provide a resource reservation method and a terminal device for reducing the power consumption of the UE.

In some embodiments of the present application provide a resource reservation method, the method including:

- when a resource reservation mode of a current service includes partial sensing and re-evaluation and/or preemption checking, controlling the partial sensing not to overlap with the re-evaluation and/or the preemption checking in a time domain; or, when there is an overlapping portion between the partial sensing and the re-evaluation and/or the preemption checking in the time domain, performing the re-evaluation and/or the preemption checking through the partial sensing for the overlapping portion; and
- reserving a target resource for information transmission based on a sensing result of the re-evaluation and/or the preemption checking.

In one embodiment, the controlling the partial sensing not to overlap with the re-evaluation and/or the preemption checking in the time domain, includes:

- determining an end time of the partial sensing; and
- performing the re-evaluation and/or the preemption checking after the end time of the partial sensing.

In one embodiment, the performing the re-evaluation and/or the preemption checking after the end time of the partial sensing, includes:

- performing the re-evaluation and/or the preemption checking through continuous sensing after the end time of the partial sensing.

In one embodiment, the partial sensing includes a period based partial sensing (PBPS) mode and a contiguous partial sensing (CPS) mode; and the performing the re-evaluation and/or the preemption checking through the partial sensing, includes:

- determining whether to use the PBPS mode or the CPS mode to perform the re-evaluation and/or the preemption checking according to an information processing duration of the re-evaluation and/or the preemption checking; or,
- determining whether to use the PBPS mode or the CPS mode to perform the re-evaluation and/or the preemption checking according to a channel busy ratio (CBR).

In one embodiment, the determining whether to use the PBPS mode or the CPS mode to perform the re-evaluation and/or the preemption checking according to the information processing duration of the re-evaluation and/or the preemption checking, includes:

- when the information processing duration of the re-evaluation and/or the preemption checking is greater than or equal to a set duration threshold, determining to use the PBPS mode to perform the re-evaluation and/or the preemption checking;
- when the information processing duration of the re-evaluation and/or the preemption checking is less than the set duration threshold, determining to use the CPS mode to perform the re-evaluation and/or the preemption checking.

In one embodiment, the information processing duration of the re-evaluation and/or the preemption checking includes any one of following durations, and each of the durations has a corresponding duration threshold:

- a first duration between a first time slot of a set of candidate resources of the re-evaluation and/or the preemption checking and a trigger time of resource selection;
- a second duration between the first time slot of the set of the candidate resources of the re-evaluation and/or the preempting checking and a start time of the resource selection;
- a third duration between a trigger time of resource reselection and the trigger time of the resource selection;
- a fourth duration between the trigger time of the resource reselection and the start time of the resource selection.

In one embodiment, the duration threshold is set by a network side device, or the duration threshold is selected from a set of duration thresholds configured by the network side device.

In one embodiment, the determining whether to use the PBPS mode or the CPS mode to perform the re-evaluation and/or the preemption checking according to the CBR, includes:

- comparing the CBR with a set CBR threshold;
- when the CBR is greater than or equal to the set CBR threshold, determining to use the CPS mode to perform the re-evaluation and/or the preemption checking;
- when the CBR is smaller than the set CBR threshold, determining that the PBPS is used to perform the re-evaluation and/or the preemption checking.

In one embodiment, the CBR threshold is set by a network side device, or, the CBR threshold is selected from a set of CBR thresholds configured by the network side device.

In one embodiment, the performing the re-evaluation and/or the preemption checking through the partial sensing, includes:

when the PBPS mode is determined to be used to perform the re-evaluation and/or the preemption checking, determining a location of a PBPS sensing opportunity based on a set time period; and performing the re-evaluation and/or the preemption checking before a first time slot of a set of candidate resources of the re-evaluation and/or the preemption checking or before a trigger time of resource reselection based on the location of the PBPS sensing opportunity.

In one embodiment, the set time period includes any one of:

a PBPS sensing period value determined according to a period value in a resource reservation period list configured by a resource pool;

the period value in the resource reservation period list configured by the resource pool;

a period value in a parameter set configured by a network side device.

In one embodiment, the performing the re-evaluation and/or the preemption checking through the partial sensing, includes:

when the CPS mode is determined to be used to perform the re-evaluation and/or the preemption checking, performing the re-evaluation and/or the preemption checking by using a continuous sensing opportunity before a trigger time of resource reselection.

In some embodiments of the present application provide a terminal device, including:

a control unit, configured to: when a resource reservation mode of a current service includes partial sensing and re-evaluation and/or preemption checking, control the partial sensing not to overlap with the re-evaluation and/or the preemption checking in a time domain; or, when there is an overlapping portion between the partial sensing and the re-evaluation and/or the preemption checking in the time domain, perform the re-evaluation and/or the preemption checking through the partial sensing for the overlapping portion;

a reserving unit, configured to reserve a target resource for information transmission based on a sensing result of the re-evaluation and/or the preemption checking.

In some embodiments of the present application provide a terminal device, including a memory, a transceiver, and a processor;

the memory is configured to store computer instructions;

the transceiver is configured to send and receive data under control of the processor;

the processor is configured to read a computer program in the memory and execute following steps:

when a resource reservation mode of a current service includes partial sensing and re-evaluation and/or preemption checking, controlling the partial sensing not to overlap with the re-evaluation and/or the preemption checking in a time domain; or, when there is an overlapping portion between the partial sensing and the re-evaluation and/or the preemption checking in the time domain, performing the re-evaluation and/or the preemption checking through the partial sensing for the overlapping portion; and reserving a target resource for information transmission based on a sensing result of the re-evaluation and/or the preemption checking.

In one embodiment, the processor is further configured to:

determine an end time of the partial sensing; and perform the re-evaluation and/or the preemption checking after the end time of the partial sensing.

In one embodiment, the processor is further configured to: perform the re-evaluation and/or the preemption checking through continuous sensing after the end time of the partial sensing.

In one embodiment, the processor is further configured to:

determine whether to use a PBPS mode or a CPS mode to perform the re-evaluation and/or the preemption checking according to an information processing duration of the re-evaluation and/or the preemption checking; or, determine whether to use the PBPS mode or the CPS mode to perform the re-evaluation and/or the preemption checking according to a CBR.

In one embodiment, the processor is configured to:

when the information processing duration of the re-evaluation and/or the preemption checking is greater than or equal to a set duration threshold, determine to use the PBPS mode to perform the re-evaluation and/or the preemption checking; and when the information processing duration of the re-evaluation and/or the preemption checking is less than the set duration threshold, determine to use the CPS mode to perform the re-evaluation and/or the preemption checking.

In one embodiment, the information processing duration of the re-evaluation and/or the preemption checking includes any one of following durations, and each of the durations has a corresponding duration threshold:

a first duration between a first time slot of a set of candidate resources of the re-evaluation and/or the preemption checking and a trigger time of resource selection;

a second duration between the first time slot of the set of the candidate resources of the re-evaluation and/or the preempting checking and a start time of the resource selection;

a third duration between a trigger time of resource reselection and the trigger time of the resource selection;

a fourth duration between the trigger time of the resource reselection and the start time of the resource selection.

In one embodiment, the duration threshold is set by a network side device, or the duration threshold is selected from a set of duration thresholds configured by the network side device.

In one embodiment, the processor is configured to:

compare the CBR with a set CBR threshold;

when the CBR is greater than or equal to the set CBR threshold, determine to use the CPS mode to perform the re-evaluation and/or the preemption checking;

when the CBR is smaller than the set CBR threshold, determine to use the PBPS mode to perform the re-evaluation and/or the preemption checking.

In one embodiment, the CBR threshold is set by a network side device, or the CBR threshold is selected from a set of CBR thresholds configured by the network side device.

In one embodiment, the processor is configured to:

when the PBPS mode is determined to be used to perform the re-evaluation and/or the preemption checking, determine a location of a PBPS sensing opportunity based on a set time period; and perform the re-evaluation and/or the preemption checking before a first time slot of a set of candidate resources of the re-evaluation and/or the preemption checking or before a trigger time of resource reselection based on the location of the PBPS sensing opportunity.

In one embodiment, the set time period includes any one of:

a PBPS sensing period value determined according to a period value in a resource reservation period list configured by a resource pool;

the period value in the resource reservation period list configured by the resource pool;

a period value in a parameter set configured by a network side device.

In one embodiment, the processor is configured to:

when the CPS mode is determined to be used to perform the re-evaluation and/or the preemption checking, perform the re-evaluation and/or the preemption checking by using a continuous sensing opportunity before a trigger time of resource reselection.

In some embodiments of the present application provide a computer-readable storage medium, the storage medium stores a computer instruction, and the computer instruction, when being executed by a processor, implements any one of the methods described in the embodiments.

Embodiments of present application provide a resource reservation method and a terminal device, when a resource reservation mode of a current service includes partial sensing and re-evaluation and/or preemption checking, the partial sensing is controlled not to overlap with the re-evaluation and/or the preemption checking in a time domain; or, when there is an overlapping portion between the partial sensing and the re-evaluation and/or the preemption checking in the time domain, the re-evaluation and/or the preemption checking is performed through the partial sensing for the overlapping portion, without performing the partial sensing and the re-evaluation and/or the preemption checking at the same time, respectively, and the power consumption of the UE can be reduced.

BRIEF DESCRIPTION OF FIGURES

In order to illustrate technical solutions in some embodiments of the present application and the related art more clearly, drawings needing to be used in descriptions of embodiments and the related art will be introduced below briefly. Apparently, the drawings described below are only some embodiments of the present application.

DETAILED DESCRIPTION

Technical solutions in embodiments of the present application are clearly and completely described below in combination with the drawings in embodiments of the present application. It should be understood that specific implementations described here are only used to illustrate and explain the present application, and are not intended to limit the present application.

It should be noted that "first", "second" used in the present application do not describe a specific order or sequence, but are only used to distinguish similar objects. "And/or" in embodiments of this application describes an association relationship between associated objects, indicating that there may be three relationships, for example, A and/or B may indicate three situations: A exists alone, A and B exist simultaneously, and B exists alone. The character "/" generally indicates that a relationship between associated objects is "or".

The network architecture and service scenarios described in embodiments of the present application are for more clearly illustrating technical solutions of embodiments of the present application, and do not constitute limitations on the technical solutions according to embodiments of the present application. With the evolution of architecture and the emergence of new service scenarios, technical solutions according to embodiments of the present application are also applicable to similar technical problems.

Figure 1:
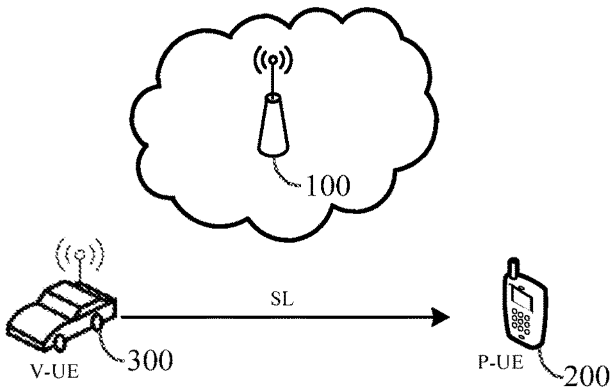
FIG. 1 is a schematic structural diagram of a communication system according to some embodiments of the present application.

FIG. 1 is a schematic structural diagram of a communication network applicable to some embodiments of the present application. The communication network may be a V2X network, or a part of the V2X network. The V2X network includes communication methods such as Vehicle to Vehicle (V2V), Vehicle to Pedestrian (V2P), Vehicle to Infrastructure (V2I) and Vehicle to Network (V2N). One end of the V2P communication may be a Person-User Equipment (P-UE), and the other end of the V2P communication may be a Vehicle-User Equipment (V-UE), such as the P-UE200 and the V-UE300 shown in FIG. 1. The communication network may further include a network side device 100. Both the P-UE200 and the V-UE300 can be connected to the network side device 100 through a wireless network. Both the P-UE200 and V-UE300 can be called terminal devices.

The network side device 100 is a device that provides wireless communication functions for a terminal device, including but not limited to: a gNB in 5G, a radio network controller (RNC), a node B (NB), a base station controller (BSC), a base transceiver station (BTS), a home node B (HNB), a base band unit (BBU), a transmitting and receiving point (TRP), a transmitting point (TP), a mobile switching center, etc. The network side device 100 may also be a device that provides wireless communication functions for terminal devices in other communication systems that may appear in the future.

The P-UE200 may be a device with a wireless communication function, which can be a mobile phone, a tablet computer (iPad), a computer with a wireless transceiver function, a virtual reality (VR) terminal, an augmented reality (AR) terminal, a wireless terminal in industrial control, etc. The V-UE300 may be a vehicle-mounted terminal in self-driving, and the V-UE300 may also be a device with a wireless communication function. Both P-UE200 and V-UE300 can provide users with voice and/or data connectivity, have a wireless connection function, and can be connected to a wireless modem, etc. the P-UE200 and V-UE300 may communicate with one or more core networks via the network side device 100.

Currently, in the NR V2X system, when the UE performs re-evaluation and/or preemption checking and partial sensing at the same time, the power consumption of the UE may be increased.

Based on this, some embodiments of the present application provide a resource reservation method. When a resource reservation mode of a current service includes partial sensing and re-evaluation and/or preemption checking, controlling the partial sensing not to overlap with the re-evaluation and/or preemption checking in a time domain; or, when there is an overlapping portion between the partial sensing and re-evaluation and/or preemption checking in the time domain, performing the re-evaluation and/or the preemption checking through the partial sensing for the overlapping portion; and reserving a target resource for information transmission based on a sensing result of the re-evaluation and/or the preemption checking. Through the above method, when where is an overlapping portion between the partial sensing and the re-evaluation and/or the preemption checking in the time domain, the re-evaluation and/or preemption checking can be performed through the partial sensing for the overlapping portion, without performing the partial sensing and the re-evaluation and/or the preemption checking at the same time, respectively, and the power consumption of the UE can be reduced while ensuring the reliability of the resource transmission.

Figure 2:
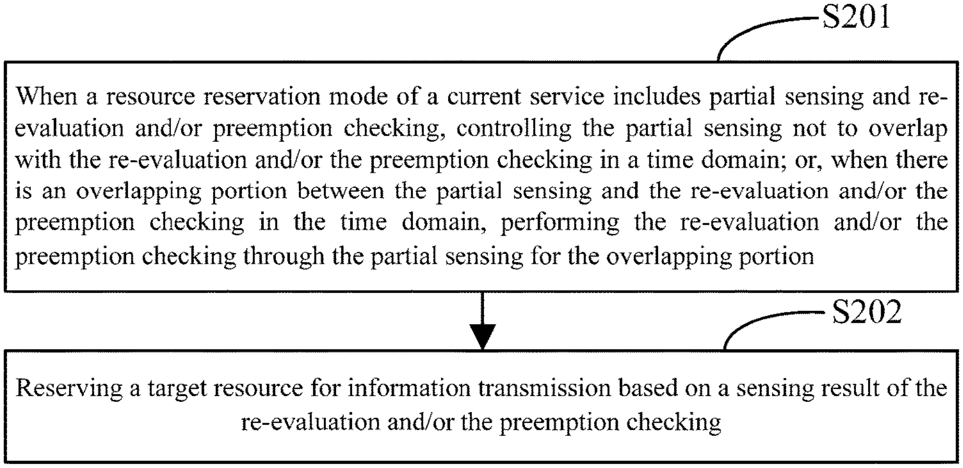
FIG. 2 is a schematic flow diagram of a resource reservation method according to some embodiments of the present application.

FIG. 2 shows a schematic flow diagram of a resource reservation method according to some embodiments of the present application. The method is performed by a terminal device, and the method for resource reservation performed by the terminal device is used as an example for description below. As shown in FIG. 2, the method includes following steps.

Step 201, when a resource reservation mode of a current service includes partial sensing and re-evaluation and/or preemption checking, controlling the partial sensing not to overlap with the re-evaluation and/or the preemption checking in a time domain; or, when there is an overlapping portion between the partial sensing and the re-evaluation and/or the preemption checking in the time domain, performing the re-evaluation and/or the preemption checking through the partial sensing for the overlapping portion.

In one embodiment, during a process of resource reservation, when the resource reservation mode of the current service includes the partial sensing and the re-evaluation and/or the preemption checking, it can be configured by a higher layer of the UE whether the re-evaluation and/or the preemption checking can overlap with the partial sensing in the time domain. For example, an identification bit used to indicate an overlapping relationship between the re-evaluation and/or the preemption checking and the partial perception may be added to a higher layer parameter, n bits (bit) may be added as the identification bit, and n may be a positive integer such as 1, 2, etc. For example, two bits can be added to the higher layer parameter. When the two bits are 00, the re-evaluation and/or the preemption checking cannot overlap with the partial sensing in the time domain; when the two bits are 11, the re-evaluation and/or the preemption checking can overlap with the partial sensing in the time domain. When the higher layer of the UE triggers the re-evaluation and/or the preemption checking, the higher layer of the UE can send configuration information to a physical layer of the UE, that is, the above-mentioned higher layer parameter includes configuration information for indicating an overlapping relationship between the re-evaluation and/or the preemption checking and the partial sensing. The physical layer of the UE performs resource sensing and reservation according to received configuration information.

When the configuration information indicates that the partial sensing cannot overlap with the re-evaluation and/or the preemption checking in the time domain, a time period for the partial sensing can be controlled not to overlap with a time period for the re-evaluation and/or the preemption checking. For example, an end time of the partial sensing may be determined, and after the end time of the partial sensing, the re-evaluation and/or the preemption checking is performed. For example, the re-evaluation and/or the preemption checking can be performed through continuous sensing.

When the configuration information indicates that the partial sensing may overlap with the re-evaluation and/or the preemption checking in the time domain, then when there is an overlapping portion between the partial sensing and the re-evaluation and/or the preemption checking in the time domain, the re-evaluation and/or the preemption checking are performed through the partial sensing for the overlapping portion, and a sensing result of the partial sensing is used as a sensing result of the re-evaluation and/or the preemption checking, without performing additional re-evaluation and/or preemption checking through the continuous sensing.

For example, when the partial sensing mode includes a period based partial sensing (PBPS) mode and a contiguous partial sensing (CPS) mode, the PBPS mode or the CPS can be determined to be used for the re-evaluation and/or the preemption checking according to an information processing duration of the re-evaluation and/or the preemption checking; or, the PBPS mode or the CPS mode can be determined to be used for the re-evaluation and/or the preemption checking according to a channel busy ratio (CBR).

Step 202, reserving a target resource for information transmission based on a sensing result of the re-evaluation and/or the preemption checking.

The UE performs the re-evaluation and/or the preemption checking according to a determined mode, and reserves the target resource for information transmission based on the sensing result of the re-evaluation and/or the preemption checking.

Through the method according to some embodiments of the present application, when the partial sensing does not overlap with the re-evaluation and/or the preemption checking in the time domain, the UE can perform the re-evaluation and/or the preemption checking through continuous sensing; and when where is an overlapping portion between the partial sensing and the re-evaluation and/or the preemption checking in the time domain, the re-evaluation and/or the preemption checking can be performed through the partial sensing for the overlapping portion, without performing additional re-evaluation and/or preemption checking through the continuous sensing, therefore, the power consumption of the UE can be reduced while ensuring the reliability of resource transmission.

The resource reservation method according to some embodiments of the present application will be described in detail below through several specific embodiments.

In one embodiment, when the resource reservation mode of the current service includes the partial sensing and the re-evaluation and/or the preemption checking, the partial sensing is controlled not to overlap with the re-evaluation and/or the preemption checking in the time domain according to indication of the configuration information.

The current service can be any transport block (TB) transmitted periodically or aperiodically. When the resource reservation mode of the current service includes the partial sensing and the re-evaluation and/or the preemption checking, the partial sensing can include the PBPS mode and/or the CPS mode for resource sensing.

During a process of resource reservation, in order to avoid resources occupied by other UEs appearing again in the set of the candidate resources, the higher layer of the UE can trigger the re-evaluation and/or the preemption checking, and send relevant configuration information to the physical layer of the UE, the configuration information includes indication information used for indicating the overlapping relationship between the re-evaluation and/or the preemption checking and the partial sensing, and the indication information may be expressed as 2 bits added to the higher layer parameter. Bits of 00 indicate that the re-evaluation and/or the preemption checking cannot overlap with the partial sensing in the time domain. After receiving the configuration information, the physical layer of the UE performs, according to the indication of the configuration information, the re-evaluation and/or the preemption checking by using the continuous sensing after the partial sensing is finished.

Figure 3:
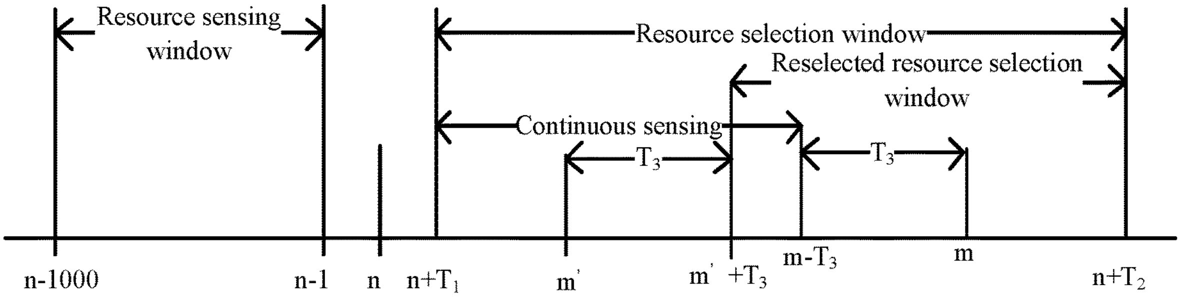
FIG. 3 is a schematic diagram of time-domain resource locations for re-evaluation and/or preemption checking according to some embodiments of the present application.

For example, as shown in FIG. 3, n−1000 is the start time of a resource sensing window, n−1 is the end time of the resource sensing window, n is the time when the service arrives, $n+T_1$ is the start time of a resource selection window, and $n+T_2$ is the end time of the resource selection window. The UE performs the partial sensing within the resource sensing window, n−1 may be considered as the end time of the partial sensing, and the re-evaluation and/or the preemption checking may be performed after time n−1. For example, the re-evaluation and/or the preemption checking may be performed through the continuous sensing, and the resource reservation may be performed within a reselected resource selection window according to a sensing result of the continuous sensing. During the continuous sensing process, when it is found that the reserved resource at time m may collide with the reserved resources of other UEs at time m', resource reselection can be performed after the processing time of $T_3$, that is, the time $m'+T_3$ is the start time of the reselected resource selection window. Within the reselected resource selection window, at least at the time $m-T_3$, a new set of candidate resources is determined, and the set of candidate resources may be called a set of candidate resources for the re-evaluation and/or the preemption checking. According to the sensing result of the continuous sensing, that is, the sensing result of the re-evaluation and/or the preemption checking, resources already occupied by other UEs are excluded from the set of candidate resources of the re-evaluation and/or the preemption checking, and the target resource for information transmission is selected and reserved from the remaining candidate resources to avoid resource collisions.

In one embodiment, when where is an overlapping portion between the partial sensing and the re-evaluation and/or the preemption checking in the time domain, the re-evaluation and/or the preemption checking is performed through the partial sensing for the overlapping portion.

The current service can be any TB transmitted periodically or aperiodically. When the resource reservation mode of the current service includes the partial sensing and the re-evaluation and/or the preemption checking, the partial sensing can include the PBPS mode and/or the CPS mode for resource sensing.

During a process of resource reservation, in order to avoid resources occupied by other UEs appearing again in the set of the candidate resources, the higher layer of the UE can trigger the re-evaluation and/or the preemption checking, and send relevant configuration information to the physical layer of the UE, the configuration information includes indication information used for indicating the overlapping relationship between the re-evaluation and/or the preemption checking and the partial sensing, and the indication information may be expressed as 2 bits added to the higher layer parameter. For example, bits of 11 indicate that the re-evaluation and/or the preemption checking may overlap with the partial sensing in the time domain, and after receiving the configuration information, the physical layer of the UE performs the resource sensing and the resource reservation according to the configuration information.

Figure 4:
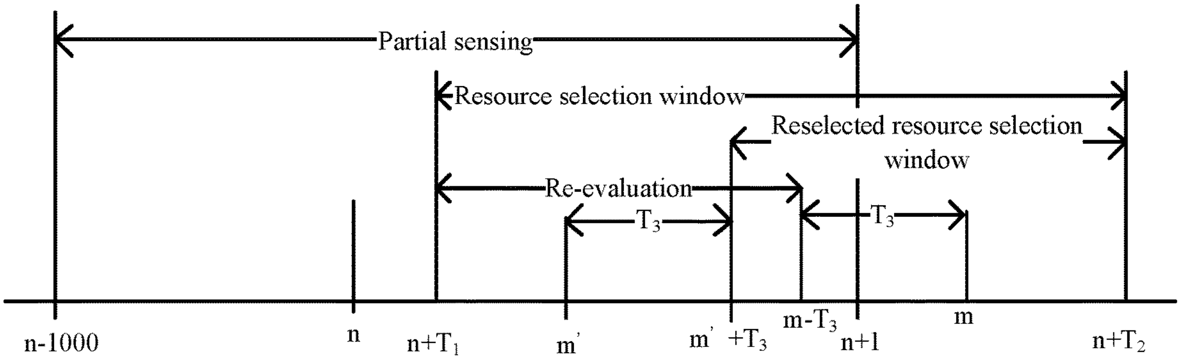
FIG. 4 is a schematic diagram of time-domain resource locations for re-evaluation and/or preemption checking according to some embodiments of the present application.

For example, as shown in FIG. 4, n−1000 is the start time of the partial sensing, n+1 is the end time of the partial sensing, n is the time when the service arrives, and is also the trigger time of the resource selection; $n+T_1$ is the start time of a resource selection window, $n+T_2$ is the end time of the resource selection window. For example, assuming that $n+T_1$ is the start time of the re-evaluation and/or the preemption checking, and $n+T_1<n+1$, from time $n+T_1$, the partial sensing and the re-evaluation and/or the preemption checking begin to overlap. For the overlapping portion, the re-evaluation and/or the preemption checking are performed through the partial sensing. According to a sensing result of the re-evaluation and/or the preemption checking, resource reservation is performed within a reselection resource selection window.

In one embodiment, when the partial sensing includes the PBPS mode and the CPS mode, the PBPS mode or the CPS mode can be determined to be used for the re-evaluation and/or the preemption according to an information processing duration of the re-evaluation and/or the preemption checking.

Figure 5:
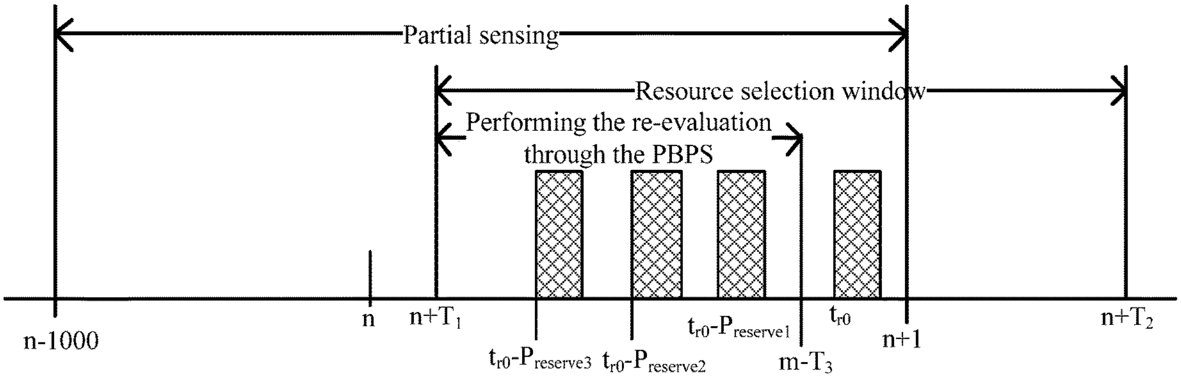
FIG. 5 is a schematic diagram of other time-domain resource locations for re-evaluation and/or preemption checking according to some embodiments of the present application.
Figure 6:
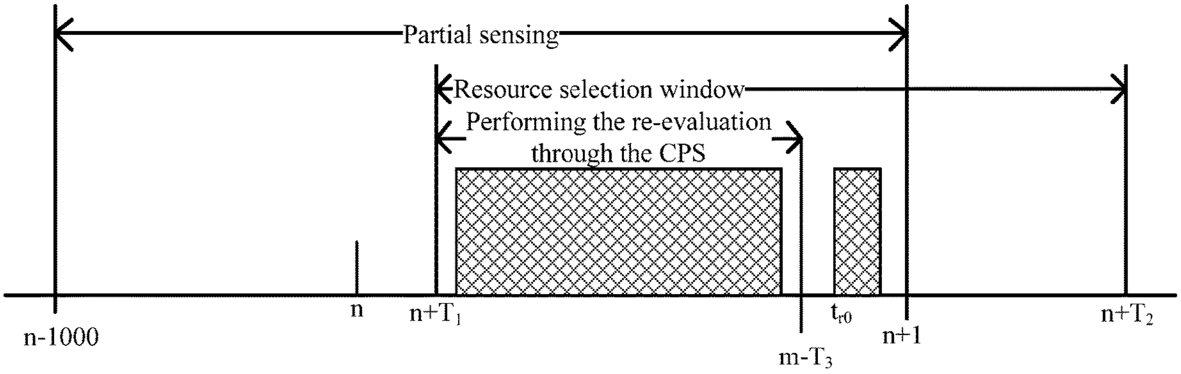
FIG. 6 is a schematic diagram of other time-domain resource locations for re-evaluation and/or preemption checking according to some embodiments of the present application.

As shown in FIG. 5 and FIG. 6, in an embodiment, the information processing duration of the re-evaluation and/or the preemption checking may be a first duration between a first time slot $t_{y0}$ of a set of the candidate resources of the re-evaluation and/the preemption checking and the trigger time n of resource selection. The first duration can be compared with a corresponding first duration threshold, when the first duration is greater than or equal to the first duration threshold, the PBPS mode is determined to be used to perform the re-evaluation and/or the preemption checking, as shown in FIG. 5; when the first duration is less than the first duration threshold, the CPS mode is determined to be used to perform the re-evaluation and/or the preemption checking, as shown in FIG. 6.

In another embodiment, the information processing duration of the re-evaluation and/or preemption checking may be a second duration between the first time slot $t_{y0}$ of the set of the candidate resources of the re-evaluation and/or the preemption checking and the start time $n+T_1$ of the resource selection. The second duration can be compared with a corresponding second duration threshold, when the second duration is greater than or equal to the second duration threshold, the PBPS mode is determined to be used to perform the re-evaluation and/or the preemption checking; when the second duration is less than the second duration threshold, the CPS mode is determined to be used to perform the re-evaluation and/or the preemption checking.

In another embodiment, the information processing duration of the re-evaluation and/or the preemption checking may be a third duration between the trigger time $m-T_3$ of resource reselection and the trigger time n of the resource selection. The third duration can be compared with a corresponding three duration threshold, when the third duration is greater than or equal to the third duration threshold, the PBPS mode is determined to be used to perform the re-evaluation and/or the preemption checking; when the third duration is less than the third duration threshold, the CPS mode is determined to be used to perform the re-evaluation and/or the preemption checking.

In another embodiment, the information processing duration of the re-evaluation and/or the preemption checking may be a fourth duration between the trigger time $m-T_3$ of the resource reselection and the start time $n+T_1$ of the resource selection. The fourth duration can be compared with a corresponding fourth duration threshold, when the fourth duration is greater than or equal to the fourth duration threshold, the PBPS mode is determined to be used to perform the re-evaluation and/or the preemption checking; when the fourth duration is less than the fourth duration threshold, the CPS mode is determined to be used to perform the re-evaluation and/or the preemption checking.

The above several duration thresholds can be set by a network side device, or can be selected from a set of duration thresholds configured by the network side device, and different information processing durations of the re-evaluation and/or the preemption checking correspond to different duration thresholds.

In one embodiment, the PBPS mode or the CPS mode may also be determined to be used to perform the re-evaluation and/or the preemption checking according to a CBR.

The CBR may be determined first, and the CBR may be compared with a set CBR threshold. The CBR threshold is set by the network side device or selected from a set of CBR thresholds configured by the network side device. When the CBR is greater than or equal to the set CBR threshold, the CPS mode is determined to be used to perform the re-evaluation and/or the preemption checking; when the CBR is smaller than the set CBR threshold, the PBPS mode is determined to be used to perform the re-evaluation and/or the preemption checking.

Through the above method, when the PBPS mode is determined to be used to perform the re-evaluation and/or the preemption checking, a location of a PBPS sensing opportunity is determined based on a set time period; resource sensing is performed before the first time slot of the set of the candidate resources of the re-evaluation and the preemption checking based on the location of the PBPS sensing opportunity; or, the re-evaluation and/or the preemption checking is performed before the trigger time of the resource reselection based on the location of the PBPS sensing opportunity. The set time period includes any one of: a PBPS sensing period value determined according to a period value in a resource reservation period list configured by a resource pool, or the period value in the resource reservation period list configured by the resource pool, or a period value of a parameter set configured by a network side device.

When the CPS mode is determined to be used to perform the re-evaluation and/or the preemption checking, the re-evaluation and/or the preemption checking is performed by using continuous sensing opportunity before the trigger time of resource reselection.

In one embodiment, when the PBPS mode is determined to be used to perform the re-evaluation and/or the preemption checking, the physical layer of the UE reports to the higher layer that the PBPS mode is determined to be used to perform the re-evaluation and/or the preemption checking. After receiving the mode used to perform the re-evaluation and/or the preemption checking sent by the physical layer of the UE, the higher layer sends configuration information related to using the PBPS mode to perform the re-evaluation and/or the preemption checking to the physical layer of the UE. The configuration information may include: configuration information related to a location when the PBPS mode is used to perform the re-evaluation and/or the preemption checking; after the physical layer of the UE receives the configuration information, the location of the PBPS sensing opportunity is determined based on a parameter in the configuration information, and the re-evaluation and/or or the preemption checking are performed.

The physical layer of the UE reports to the higher layer of the UE that the PBPS mode is determined to be used to perform the re-evaluation and/or the preemption checking. After receiving the mode used to perform the re-evaluation and/or the preemption checking sent by the physical layer of the UE, the high layer sends configuration information related to using the PBPS mode to perform the re-evaluation and/or the preemption checking to the physical layer of the UE. The configuration information can be: a $P_{reserve}$ value indicating the location of the PBPS sensing opportunity, that is, the PBPS sensing period value determined according to the period value in the resource reservation period list configured by the resource pool. The $P_{reserve}$ value is a sensing step length and can include multiple values, for example, $P_{reserve1}$, $P_{reserve2}$, and $P_{reserve3}$. The UE determines the location of the PBPS sensing opportunity according to the received $P_{reserve}$ value, and performs the re-evaluation and/or the preemption checking before the first time slot (time $t_{r0}$) of the set of candidate resources of the re-evaluation and/or the preemption checking or before the trigger time (that is, $m-T_3$ time). As shown in FIG. 5, the UE performs sensing at three times: $t_{r0}-P_{reserve3}$, $t_{r0}-P_{reserve2}$ and $t_{r0}-P_{reserve1}$, respectively. The UE may reserve the target resource for information transmission based on the sensing result of the re-evaluation and/or the preemption checking. In this embodiment, the location of the PBPS sensing opportunity may be a whole set or a subset of values of $P_{reserve}$.

In another embodiment, after receiving the mode used to perform the re-evaluation and/or the preemption checking sent by the physical layer of the UE, the higher layer sends configuration information related to using the PBPS mode to perform the re-evaluation and/or the preemption checking to the physical layer of the UE. The configuration information may also be: a period value in a resource reservation period list (sl-ResourceReservePeriodList) configured by a resource pool, and the UE determines the location of the PBPS sensing opportunity according to a received period value in the resource reservation period list, and performs the re-evaluation and/or the preemption checking before the first time slot ($t_{r0}$) of the set of the candidate resources of the re-evaluation and/or the preemption checking or before the trigger time (i.e. $m-T_3$ time) of the resource reselection. The UE may reserve the target resource for information transmission based on the sensing result of the re-evaluation and/or the preemption checking. In this embodiment, the location of the PBPS sensing opportunity may be a whole set or a subset of parameters in the resource reservation period list.

In another embodiment, after receiving the mode used to perform the re-evaluation and/or the preemption checking sent by the physical layer of the UE, the higher layer sends configuration information related to using the PBPS mode to perform the re-evaluation and/or preemption checking to the physical layer of the UE. The configuration information may also be: a period value indicating a sensing opportunity for the re-evaluation and/or the preemption checking, that is, a period value in a parameter set configured by the network side device. The UE determines the location of the PBPS sensing opportunity according to the received period value of the sensing opportunity for the re-evaluation and/or the preemption checking, and performs the re-evaluation and/or the preemption checking before the first time slot ($t_{r0}$) of the set of the candidate resources of the re-evaluation and/or the preemption checking or before the trigger time $m-T_3$ of the resource reselection. The UE may reserve the target resource for information transmission based on the sensing result of the re-evaluation and/or the preemption checking. In this embodiment, the location of the PBPS sensing opportunity is selected by the higher layer in the parameter set configured by the network side device.

In one embodiment, when the CPS mode is determined to be used to perform the re-evaluation and/or the preemption checking, the physical layer of the UE reports to the higher layer that the CPS mode is determined to be used to perform the re-evaluation and/or the preemption checking. After receiving the mode used to perform the re-evaluation and/or the preemption checking sent by the physical layer of the UE, the higher layer sends configuration information related to using the CPS mode to perform the re-evaluation and/or the preemption checking to the physical layer of the UE. After receiving the configuration information, the UE performs the re-evaluation and/or the preemption checking through the CPS mode, and reserves the target resource for information transmission based on the sensing result of the re-evaluation and/or the preemption checking.

In the resource reservation method according to some embodiments of the present application, when there is an overlapping portion between the partial sensing and the re-evaluation and/or the preemption checking in the time domain, the re-evaluation and/or the preemption checking can be performed through the partial sensing for the overlapping portion, instead of performing the partial sensing and the re-evaluation and/or the preemption checking at the same time respectively, reducing the power consumption of the UE while ensuring the reliability of resource transmission.

Based on the same technical concept, some embodiments of the present application further provide a terminal device, the terminal device can implement processes performed in foregoing embodiments.

Figure 7:
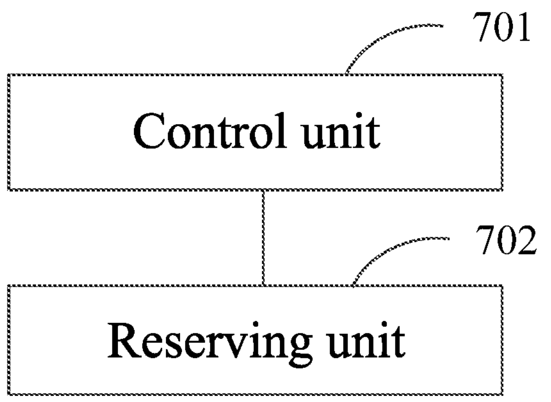
FIG. 7 is a structural block diagram of a terminal device according to some embodiments of the present application.

FIG. 7 is a schematic structural diagram of a terminal device according to some embodiments of the present application. As shown in FIG. 7, the terminal device includes: a control unit 701 and a reservation unit 702.

The control unit 701 is configured to: when a resource reservation mode of a current service includes partial sensing and re-evaluation and/or preemption checking, control the partial sensing not to overlap with the re-evaluation and/or the preemption checking in a time domain; or, when there is an overlapping portion between the partial sensing and the re-evaluation and/or the preemption checking in the time domain, perform the re-evaluation and/or the preemption checking through the partial sensing for the overlapping portion.

The reserving unit 702 is configured to reserve a target resource for information transmission based on a sensing result of the re-evaluation and/or the preemption checking.

In one embodiment, the control unit 701 may further be configured to:

- determine an end time of partial sensing; and
- perform the re-evaluation and/or the preemption checking after the end time of the partial sensing.

In one embodiment, the control unit 701 may further be configured to:

- perform the re-evaluation and/or the preemption checking through continuous sensing after the end time of partial sensing.

In one embodiment, the control unit 701 may further be configured to:

- determine whether to use a PBPS mode or a CPS mode to perform the re-evaluation and/or the preemption checking according to an information processing duration of the re-evaluation and/or the preemption checking; or,
- determine whether to use the PBPS mode or the CPS mode to perform the re-evaluation and/or the preemption checking according to a channel busy ratio (CBR).

In one embodiment, the control unit 701 is configured to:

- when the information processing duration of the re-evaluation and/or the preemption checking is greater than or equal to a set duration threshold, determine to use the PBPS mode to perform the re-evaluation and/or the preemption checking;
- when the information processing duration of the re-evaluation and/or the preemption checking is less than the set duration threshold, determine to use the CPS mode to perform the re-evaluation and/or the preemption checking.

In one embodiment, the information processing duration of the re-evaluation and/or the preemption checking includes any one of following durations, and each of the durations has a corresponding duration threshold:

- a first duration between a first time slot of a set of candidate resources of the re-evaluation and/or the preemption checking and a trigger time of resource selection;
- a second duration between the first time slot of the set of the candidate resources of the re-evaluation and/or the preempting checking and a start time of the resource selection;
- a third duration between a trigger time of resource reselection and the trigger time of the resource selection;
- a fourth duration between the trigger time of the resource reselection and the start time of the resource selection.

In one embodiment, the duration threshold is set by a network side device, or the duration threshold is selected from a set of duration thresholds configured by the network side device.

In one embodiment, the control unit 701 is configured to:

- compare the CBR with a set CBR threshold;
- when the CBR is greater than or equal to the set CBR threshold, determine to use the CPS mode to perform the re-evaluation and/or the preemption checking; and
- when the CBR is smaller than the set CBR threshold, determine to use the PBPS mode to perform the re-evaluation and/or the preemption checking.

In one embodiment, the CBR threshold is set by a network side device, or the CBR threshold is selected from a set of CBR thresholds configured by the network side device.

In one embodiment, the control unit 701 is configured to:

when the PBPS mode is determined to be used to perform the re-evaluation and/or the preemption checking, determine a location of a PBPS sensing opportunity based on a set time period; and perform the re-evaluation and/or the preemption checking before a first time slot of a set of the candidate resources of the re-evaluation and/or preemption checking or before a trigger time of resource reselection based on the location of the PBPS sensing opportunity.

In one embodiment, the set time period includes any one of following:

a PBPS sensing period value determined according to a period value in a resource reservation period list configured by a resource pool;

the period value in the resource reservation period list configured by the resource pool;

a period value in the a parameter set configured by a network side device.

In one embodiment, the control unit 701 is configured to:

when the CPS mode is determined to be used to perform the re-evaluation and/or the preemption checking, perform the re-evaluation and/or the preemption checking by using a continuous sensing opportunity before a trigger time of resource reselection.

Based on the same technical concept, some embodiments of the present application further provide a terminal device. The terminal device can implement processes of the method performed in FIG. 2 in foregoing embodiments.

Figure 8:
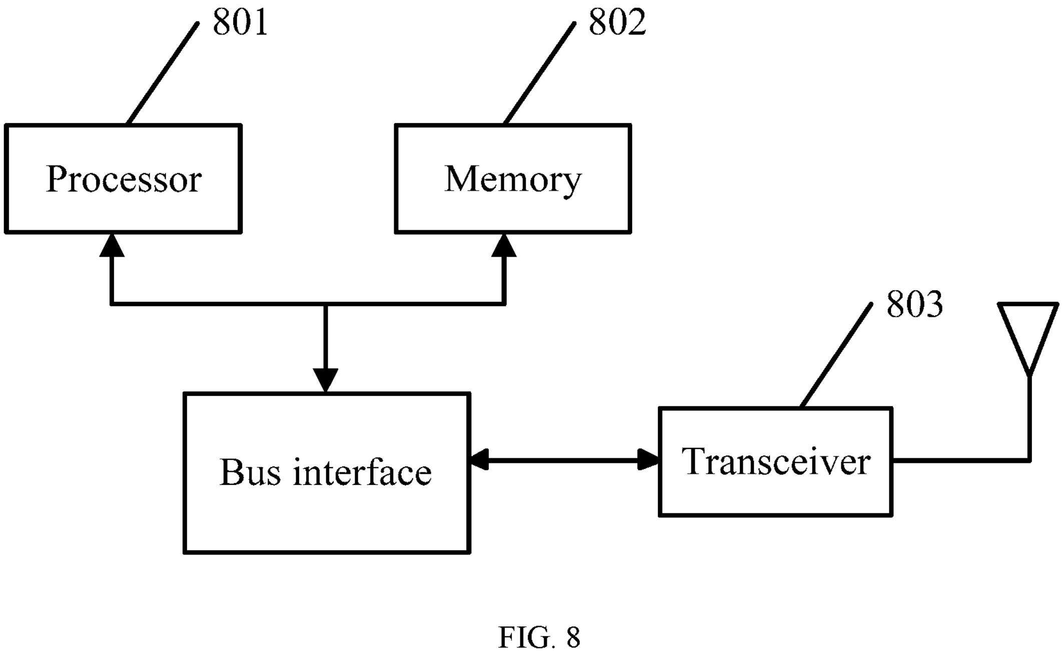
FIG. 8 is another schematic structural diagram of a terminal device according to some embodiments of the present application.

FIG. 8 shows a schematic structural diagram of a terminal device according to some embodiments of the present application, that is, shows another schematic structural diagram of the terminal device. As shown in FIG. 8, the terminal device includes a processor 801, a memory 802, and a transceiver 803.

The processor 801 is responsible for managing a bus architecture and general processing, and the memory 802 may store data used by the processor 801 when performing operations. The transceiver 803 is configured to receive and send data under control of the processor 801.

The bus architecture may include any number of interconnected buses and bridges, and various circuits including one or more processors represented by the processor 801 and the memory represented by the memory 802 are linked together. The bus architecture can also link together various other circuits such as a peripheral device, a voltage regulator, and a power management circuit, etc., which are well known in the art and therefore will not be further described herein. A bus interface provides an interface. The processor 801 is responsible for managing the bus architecture and general processing, and the memory 802 can store data used by the processor 801 when performing operations.

The processes disclosed in some embodiments of the present application may be applied to the processor 801 or implemented by the processor 801. In an implementation process, each step of the signal processing flow may be completed by an integrated logic circuit of hardware or instructions in the form of software in the processor 801. The processor 801 may be a general purpose processor, a digital signal processor, an application-specific integrated circuit, a field programmable gate array or other programmable logic device, a discrete gate or transistor logic device, or a discrete hardware component, and may realize or execute the method, step and logic block diagram disclosed in some embodiments of the present application. The general purpose processor may be a microprocessor or any conventional processor or the like. The steps of the method disclosed in some embodiments of the present application may be directly implemented by a hardware processor, or implemented by a combination of hardware and software modules in the processor. The software module can be located in a mature storage medium in the art such as a random access memory, a flash memory, a read-only memory, a programmable read-only memory or an electrically erasable programmable memory, a register. The storage medium is located in the memory 802, and the processor 801 reads the information in the memory 802, and completes the steps of the signal processing process in combination with its hardware.

The processor 801 is configured to read a program in the memory 802 and execute:

when a resource reservation mode of a current service includes partial sensing and re-evaluation and/or preemption checking, controlling the partial sensing not to overlap with the re-evaluation and/or the preemption checking in a time domain; or, when there is an overlapping portion between the partial sensing and the re-evaluation and/or the preemption checking in the time domain, performing the re-evaluation and/or the preemption checking through partial perception for the overlapping portion; and reserving a target resource for information transmission based on a sensing result of the re-evaluation and/or the preemption checking.

In one embodiment, the processor 801 may further be configured to:

determine an end time of the partial sensing; and perform the re-evaluation and/or the preemption checking after the end time of the partial sensing.

In one embodiment, the processor 801 may further be configured to:

determine whether to use a PBPS mode or a CPS mode to perform the re-evaluation and/or the preemption checking, according to an information processing duration of the re-evaluation and/or the preemption checking; or, determined whether to use the PBPS mode or the CPS mode to perform the re-evaluation and/or the preemption checking according to a channel busy ratio (CBR).

In one embodiment, the processor 801 is configured to:

when the information processing duration of the re-evaluation and/or the preemption checking is greater than or equal to a set duration threshold, determine to use the PBPS mode to perform the re-evaluation and/or the preemption checking;

when the information processing duration of the re-evaluation and/or the preemption checking is less than the set duration threshold, determine to use the CPS mode to perform the re-evaluation and/or preemption checking.

In one embodiment, the information processing duration of the re-evaluation and/or the preemption checking includes any one of following durations, and each of the durations has a corresponding duration threshold:

a first duration between a first time slot of a set of candidate resources of the re-evaluation and/or the preemption checking and a trigger time of resource selection;

a second duration between the first time slot of the set of the candidate resources of the re-evaluation and/or the preempting checking and a start time of the resource selection;

a third duration between a trigger time of resource reselection and the trigger time of the resource selection;

a fourth duration between the trigger time of the resource reselection and the start time of the resource selection.

In one embodiment, the duration threshold is set by a network side device, or the duration threshold is selected from a set of duration thresholds configured by the network side device.

In one embodiment, the processor 801 is configured to:

determine the CBR, and compare the CBR with a set CBR threshold;

when the CBR is greater than or equal to the set CBR threshold, determine to use the CPS mode to perform the re-evaluation and/or the preemption checking;

when the CBR is smaller than the set CBR threshold, determine to use the PBPS mode to perform the re-evaluation and/or the preemption checking.

In one embodiment, the CBR threshold is set by a network side device, or the CBR threshold is selected from a set of CBR thresholds configured by the network side device.

In one embodiment, the processor 801 is configured to:

when the PBPS mode is determined to be used to perform the re-evaluation and/or the preemption checking, determine a location of a PBPS sensing opportunity based on a set time period; and perform the re-evaluation and/or the preemption checking before a trigger time of resource reselection based on the location of the PBPS sensing opportunity.

In one embodiment, the set time period includes any one of:

a PBPS sensing period value determined according to a period value in the resource reservation period list configured by a resource pool;

the period value in the resource reservation period list configured by the resource pool;

a period value in a parameter set configured by a network side device.

In one embodiment, the processor 801 is configured to:

when the CPS mode is determined to be used to perform the re-evaluation and/or the preemption checking, perform the re-evaluation and/or the preemption checking by using a continuous sensing opportunity before a trigger time of resource reselection.

Some embodiments of the present application further provide a computing device readable storage medium for the resource reservation method, that is, the content will not be lost after power off. The storage medium stores software programs including program codes. When the program codes run on the computing device, the software programs can implement the scheme of any of the resource reservation methods in the above embodiments of the present application when being read and executed by one or more processors.

Embodiments of the present application may be provided as a method, a system, or a computer program product. Accordingly, the present application may take the form of an entirely hardware embodiment, an entirely software embodiment, or an embodiment combining software and hardware aspects. Furthermore, the present application may take the form of a computer program product embodied on one or more computer usable storage media (including but not limited to a disk storage, a CD-ROM, an optical storage, etc.) in which computer useable program codes are contained.

The present application is described with reference to flow charts and/or block diagrams of the method, the apparatus (system), and the computer program product according to the present application. It should be understood that respective flows and/or blocks in the flow chart and/or the block diagram, and combinations of flows and/or the blocks in the flow chart and/or the block diagram can be realized by computer program instructions. These computer program instructions may be provided to a general purpose computer, a special purpose computer, an embedded processor, or a processor of other programmable data processing equipment to produce a machine, and an apparatus for realizing the functions specified in one or more procedures of the flow chart and/or one or more blocks of the block diagram can be generated based on the instructions executed by the processor of the computer or other programmable data processing equipment.

These computer program instructions may also be stored in a computer-readable memory capable of directing a computer or other programmable data processing apparatus to operate in a specific manner, and the instructions stored in the computer-readable memory produce a manufactured product including instruction apparatus, and the instruction apparatus implements the functions specified in the one or more flow of the flow chart and/or one or more blocks of the block diagram.

These computer program instructions can also be loaded onto a computer or other programmable data processing devices, causing a series of operational steps to be performed on the computer or other programmable devices to produce a computer-implemented process, thereby, the instructions executed on the computer or other programmable devices provide steps for implementing the functions specified in one or more flow of the flow chart and/or one or more blocks of the block diagrams.

What is claimed is:

1. A resource reservation method, the method comprising:

when a resource reservation mode of a current service comprises partial sensing and re-evaluation and/or preemption checking, controlling the partial sensing not to overlap with the re-evaluation and/or the preemption checking in a time domain; or, when there is an overlapping portion between the partial sensing and the re-evaluation and/or the preemption checking in the time domain, performing the re-evaluation and/or the preemption checking through the partial sensing for the overlapping portion; and reserving a target resource for information transmission based on a sensing result of the re-evaluation and/or the preemption checking;

wherein the partial sensing comprises a period based partial sensing, PBPS, mode and a contiguous partial sensing, CPS, mode; and the performing the re-evaluation and/or the preemption checking through the partial sensing, comprises:

determining whether to use the PBPS mode or the CPS mode to perform the re-evaluation and/or the preemption checking according to an information processing duration of the re-evaluation and/or the preemption checking; or, determining whether to use the PBPS mode or the CPS mode to perform the re-evaluation and/or the preemption checking according to a channel busy ratio, CBR; and/or when the PBPS mode is determined to be used to perform the re-evaluation and/or the preemption checking, determining a location of a PBPS sensing opportunity based on a set time period; and performing the re-evaluation and/or the preemption checking before a first time slot of a set of candidate resources of the re-evaluation and/or the preemption checking or before a trigger time of resource reselection based on the location of the PBPS sensing opportunity; and/or when the CPS mode is determined to be used to perform the re-evaluation and/or the preemption checking, performing the re-evaluation and/or the preemption checking by using a continuous sensing opportunity before a trigger time of resource reselection.

2. The method according to claim 1, wherein the controlling the partial sensing not to overlap with the re-evaluation and/or the preemption checking in the time domain, comprises:

determining an end time of the partial sensing; and performing the re-evaluation and/or the preemption checking after the end time of the partial sensing.

3. The method according to claim 2, wherein the performing the re-evaluation and/or the preemption checking after the end time of the partial sensing, comprises:

performing the re-evaluation and/or the preemption checking through continuous sensing after the end time of the partial sensing.

4. The method according to claim 1, wherein the determining whether to use the PBPS mode or the CPS mode to perform the re-evaluation and/or the preemption checking according to the information processing duration of the re-evaluation and/or the preemption checking, comprises:

when the information processing duration of the re-evaluation and/or the preemption checking is greater than or equal to a set duration threshold, determining to use the PBPS mode to perform the re-evaluation and/or the preemption checking;

when the information processing duration of the re-evaluation and/or the preemption checking is less than the set duration threshold, determining to use the CPS mode to perform the re-evaluation and/or the preemption checking.

5. The method according to claim 4, wherein the information processing duration of the re-evaluation and/or the preemption checking comprises any one of following durations, and each of the durations has a corresponding duration threshold:

a first duration between a first time slot of a set of candidate resources of the re-evaluation and/or the preemption checking and a trigger time of resource selection;

a second duration between the first time slot of the set of the candidate resources of the re-evaluation and/or the preempting checking and a start time of the resource selection;

a third duration between a trigger time of resource reselection and the trigger time of the resource selection;

a fourth duration between the trigger time of the resource reselection and the start time of the resource selection.

6. The method according to claim 4, wherein the duration threshold is set by a network side device, or the duration threshold is selected from a set of duration thresholds configured by the network side device.

7. The method according to claim 1, wherein the determining whether to use the PBPS mode or the CPS mode to perform the re-evaluation and/or the preemption checking according to the CBR, comprises:

comparing the CBR with a set CBR threshold;

when the CBR is greater than or equal to the set CBR threshold, determining to use the CPS mode to perform the re-evaluation and/or the preemption checking;

when the CBR is smaller than the set CBR threshold, determining to use the PBPS mode to perform the re-evaluation and/or the preemption checking.

8. The method according to claim 7, wherein the CBR threshold is set by a network side device, or, the CBR threshold is selected from a set of CBR thresholds configured by the network side device.

9. The method according to claim 1, wherein the set time period comprises any one of:

a PBPS sensing period value determined according to a period value in a resource reservation period list configured by a resource pool;

the period value in the resource reservation period list configured by the resource pool;

a period value in a parameter set configured by a network side device.

10. A terminal device, comprising: a memory, a transceiver, and a processor;

wherein the memory is configured to store computer instructions;

the transceiver is configured to send and receive data under control of the processor;

the processor is configured to read a computer program in the memory and execute following steps:

when a resource reservation mode of a current service comprises partial sensing and re-evaluation and/or preemption checking, controlling the partial sensing not to overlap with the re-evaluation and/or the preemption checking in a time domain; or, when there is an overlapping portion between the partial sensing and the re-evaluation and/or the preemption checking in the time domain, performing the re-evaluation and/or the preemption checking through the partial sensing for the overlapping portion; and reserving a target resource for information transmission based on a sensing result of the re-evaluation and/or the preemption checking;

wherein the partial sensing comprises a period based partial sensing, PBPS, mode and a contiguous partial sensing, CPS, mode; and the step of performing the re-evaluation and/or the preemption checking through the partial sensing, comprises:

determining whether to use the PBPS mode or the CPS mode to perform the re-evaluation and/or the preemption checking according to an information processing duration of the re-evaluation and/or the preemption checking; or, determining whether to use the PBPS mode or the CPS mode to perform the re-evaluation and/or the preemption checking according to a channel busy ratio, CBR; and/or when the PBPS mode is determined to be used to perform the re-evaluation and/or the preemption checking, determining a location of a PBPS sensing opportunity based on a set time period; and performing the re-evaluation and/or the preemption checking before a first time slot of a set of candidate resources of the re-evaluation and/or the preemption checking or before a trigger time of resource reselection based on the location of the PBPS sensing opportunity; and/or when the CPS mode is determined to be used to perform the re-evaluation and/or the preemption checking, performing the re-evaluation and/or the preemption checking by using a continuous sensing opportunity before a trigger time of resource reselection.

11. The terminal device according to claim 10, wherein the processor is further configured to:

determine an end time of the partial sensing; and perform the re-evaluation and/or the preemption checking after the end time of the partial sensing.

12. The terminal device according to claim 11, wherein the processor is further configured to:

perform the re-evaluation and/or the preemption checking through continuous sensing after the end time of the partial sensing.

13. The terminal device according to claim 10, wherein the processor is configured to:

when the information processing duration of the re-evaluation and/or the preemption checking is greater than or equal to a set duration threshold, determine to use the PBPS mode to perform the re-evaluation and/or the preemption checking;

when the information processing duration of the re-evaluation and/or the preemption checking is less than the set duration threshold, determine to use the CPS mode to perform the re-evaluation and/or the preemption checking.

14. The terminal device according to claim 13, wherein the information processing duration of the re-evaluation and/or the preemption checking comprises any one of following durations, and each of the durations has a corresponding duration threshold:

a first duration between a first time slot of a set of candidate resources of the re-evaluation and/or the preemption checking and a trigger time of resource selection;

a second duration between the first time slot of the set of the candidate resources of the re-evaluation and/or the preempting checking and a start time of the resource selection;

a third duration between a trigger time of resource reselection and the trigger time of the resource selection;

a fourth duration between the trigger time of the resource reselection and the start time of the resource selection.

15. The terminal device according to claim 13, wherein the duration threshold is set by a network side device, or the duration threshold is selected from a set of duration thresholds configured by the network side device.

16. The terminal device according to claim 10, wherein the processor is configured to:

compare the CBR with a set CBR threshold;

when the CBR is greater than or equal to the set CBR threshold, determine to use the CPS mode to perform the re-evaluation and/or the preemption checking;

when the CBR is smaller than the set CBR threshold, determine to use the PBPS mode to perform the re-evaluation and/or the preemption checking.

17. The terminal device according to claim 16, wherein the CBR threshold is set by a network side device, or the CBR threshold is selected from a set of CBR thresholds configured by the network side device.

18. The terminal device according to claim 10, wherein the set time period comprises any one of:

a PBPS sensing period value determined according to a period value in a resource reservation period list configured by a resource pool;

the period value in the resource reservation period list configured by the resource pool;

a period value in a parameter set configured by a network side device.

* * * * *